(12) United States Patent
Mori et al.

(10) Patent No.: US 10,570,794 B2
(45) Date of Patent: Feb. 25, 2020

(54) ELECTRICALLY HEATED CATALYST DEVICE

(71) Applicant: TOYOTA JIDOSHA KABUSHIKI KAISHA, Toyota-shi, Aichi (JP)

(72) Inventors: Rentaro Mori, Kasugai (JP); Takeo Kobayashi, Miyoshi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 16/410,069

(22) Filed: May 13, 2019

(65) Prior Publication Data
US 2019/0368403 A1    Dec. 5, 2019

(30) Foreign Application Priority Data

Jun. 1, 2018 (JP) ................................. 2018-106466

(51) Int. Cl.
| | |
|---|---|
| *F01N 3/20* | (2006.01) |
| *B01D 53/94* | (2006.01) |
| *H05B 3/03* | (2006.01) |
| *H05B 3/34* | (2006.01) |
| *H05B 3/06* | (2006.01) |

(52) U.S. Cl.
CPC ........... *F01N 3/2026* (2013.01); *B01D 53/94* (2013.01); *H05B 3/03* (2013.01); *H05B 3/06* (2013.01); *H05B 3/34* (2013.01); *B01D 2255/1021* (2013.01); *B01D 2255/1023* (2013.01); *B01D 2255/1025* (2013.01)

(58) Field of Classification Search
CPC .......... F01N 3/2026; B01D 2255/1021; B01D 2255/1025; H05B 3/03; H05B 3/06
USPC .................................................. 422/174, 180
See application file for complete search history.

(56) References Cited

U.S. PATENT DOCUMENTS

| | | | |
|---|---|---|---|
| 2012/0121476 A1 | 5/2012 | Kinoshita et al. | |
| 2013/0062328 A1 | 3/2013 | Shimoda et al. | |
| 2014/0301908 A1 | 10/2014 | Takagaki et al. | |
| 2015/0247436 A1* | 9/2015 | Nakayama | F01N 3/2026 60/300 |

FOREIGN PATENT DOCUMENTS

| | | |
|---|---|---|
| JP | 2012066188 A | 4/2012 |
| WO | 2012/063353 A1 | 5/2012 |
| WO | 2013/038449 A1 | 3/2013 |
| WO | 2013/098889 A1 | 7/2013 |

* cited by examiner

*Primary Examiner* — Tom P Duong
(74) *Attorney, Agent, or Firm* — Sughrue Mion, PLLC

(57) ABSTRACT

An electrically heated catalyst device that can uniformly heat a catalyst via comb-shaped electrodes even when current is repeatedly made to flow through the electrodes. The device includes a carrier having a metal catalyst supported thereon, a pair of comb-shaped electrodes each having wire portions, a base layer between each comb-shaped electrode and the carrier, and a fixation layer for fixing each wire portion on the base layer. The fixation layer is rectangular in shape when the outer peripheral surface of the carrier is seen from a direction orthogonal to the central axis of the carrier along the longitudinal direction of the device. A pair of opposite first sides of the fixation layer are parallel with the extending direction of each wire portion on opposite sides thereof, and a pair of second sides coupling opposite ends of the first sides are orthogonal to the extending direction of each wire portion.

3 Claims, 9 Drawing Sheets

ELECTRICALLY HEATED CATALYST DEVICE

CROSS REFERENCE TO RELATED APPLICATIONS

The present application claims priority from Japanese patent application JP 2018-106466 filed on Jun. 1, 2018, the content of which is hereby incorporated by reference into this application.

BACKGROUND

Technical Field

The present disclosure relates to an electrically heated catalyst device that includes at least a carrier having a catalyst supported thereon and an electrode attached to the carrier.

Background Art

Conventionally, an electrically heated catalyst device is known that is heated with current flowing therethrough so as to purify exhaust gas. For example, such an electrically heated catalyst device includes a carrier having a metal catalyst supported thereon, and comb-shaped electrodes fixed on the carrier so as to flow current through the carrier. Herein, the comb-shaped electrodes allow current from an external power supply, such as a battery, to flow through the carrier so that the carrier is heated with the current flowing therethrough via the comb-shaped electrodes, and the metal catalyst supported on the carrier is activated. According to such an electrically heated catalyst device, exhaust gas can be effectively purified as the carrier is forcibly heated with the current flowing therethrough.

As an example of such an electrically heated catalyst device, WO 2012/063353 A discloses an electrically heated catalyst device that includes a carrier and comb-shaped electrodes fixed on the carrier via fixation layers, each electrode having a plurality of wire portions extending from a proximal portion thereof along the circumferential direction of the carrier. Herein, each fixation layer is circular in shape when the outer peripheral surface of the carrier is seen from a direction orthogonal to the central axis of the carrier along the longitudinal direction.

SUMMARY

However, when current is repeatedly made to flow through the comb-shaped electrodes of the aforementioned electrically heated catalyst device, cracks may be generated locally in the fixation layers due to thermal stress applied thereto resulting from the repeatedly flowed current. Accordingly, current may not be able to flow through the carrier from the wire portions via the crack-generated portions of the fixation layers, and thus, the carrier may not be heated uniformly.

The present disclosure has been made in view of the foregoing, and provides an electrically heated catalyst device that can uniformly heat a catalyst via comb-shaped electrodes even when current is repeatedly made to flow through the comb-shaped electrodes.

Herein, the inventors have conducted concentrated studies and found that when each wire portion of the comb-shaped electrode is fixed while being greatly displaced from the center of each circular fixation layer, the contact lengths of the regions of the fixation layer that are in contact with the respective opposite edges of the wire portion will be different, thus generating excessive stress in the region of the fixation layer with a longer contact length, and such excessive stress generates cracks in the fixation layer.

Accordingly, an electrically heated catalyst device in accordance with the present disclosure is a device including a carrier having a metal catalyst supported thereon; a pair of comb-shaped electrodes each including a proximal portion and a plurality of wire portions, the proximal portion extending along the longitudinal direction of the carrier, and the wire portions extending from the proximal portion along the circumferential direction of the carrier; a base layer formed on the outer peripheral surface of the carrier, the base layer being provided between each comb-shaped electrode and the carrier; and a fixation layer joined to the base layer so as to partially cover each wire portion, thereby fixing each wire portion on the base layer, in which the fixation layer is rectangular in shape when the outer peripheral surface of the carrier is seen from a direction orthogonal to the central axis of the carrier along the longitudinal direction, a pair of opposite first sides of the rectangular fixation layer are parallel with the extending direction of each wire portion on opposite sides of the wire portion, and a pair of second sides coupling opposite ends of the pair of first sides are orthogonal to the extending direction of each wire portion.

According to the present disclosure, the opposite edges of each wire portion are arranged so as to face the respective first sides of the fixation layer, and the second sides of the fixation layer are orthogonal to the extending direction of each wire portion. Therefore, the lengths of the edges of the wire portion that are in contact with the fixation layer can be made equal. Such a relationship can be maintained even when each wire portion of the comb-shaped electrode is fixed while being greatly displaced from the center of the rectangular fixation layer.

Accordingly, stress applied to the regions of the fixation layer that are in contact with the respective opposite edges of each wire portion becomes approximately equal, and thus, generation of excessive stress due to a position displacement of the wire portion can be suppressed. Therefore, even when current is repeatedly made to flow through the pair of comb-shaped electrodes, the carrier can be uniformly heated via the comb-shaped electrodes, and generation of cracks in the fixation layer can be suppressed.

Further, a corner of the fixation layer that is formed by an end of each first side and an end of each second side may be roundish. According to such a configuration, generation of cracks in the corner can be suppressed as it is roundish; otherwise, the corner of the fixation layer is likely to have cracks generated therein due to thermal shocks applied thereto when current is repeatedly made to flow through the comb-shaped electrodes.

Furthermore, a gap may be formed between the base layer and a region of each wire portion covered with the fixation layer. According to such a configuration, current flows through the base layer from the wire portion via the fixation layer as a gap is formed between the base layer and the region of the wire portion covered with the fixation layer. Therefore, excessive current is likely to flow through the regions of the fixation layer that are in contact with the respective opposite edges of the wire portion, so that heat is generated in the regions and stress concentration is thus likely to occur therein.

However, even in such a case, such stress concentration can be reduced since the contact lengths of the regions of the fixation layer that are in contact with the respective opposite edges of the wire portion are equal. Accordingly, stress applied to the regions of the fixation layer that are in contact with the respective opposite edges of the wire portion becomes approximately equal, and thus, generation of excessive stress due to a position displacement of the wire portion with respect to the fixation layer can be suppressed. Thus, generation of cracks in the fixation layer can be suppressed even when current is repeatedly made to flow through the comb-shaped electrodes.

According to the present disclosure, a catalyst can be uniformly heated via the comb-shaped electrodes even when current is repeatedly made to flow through the comb-shaped electrodes.

DETAILED DESCRIPTION

Hereinafter, an electrically heated catalyst device in accordance with an embodiment of the present disclosure will be described with reference to FIGS. 1A to 3. Then, a method for producing the electrically heated catalyst device illustrated in FIG. 1A will be briefly described with reference to FIGS. 4A to 4E.

1. Regarding an Electrically Heated Catalyst Device 1

Figure 1A:
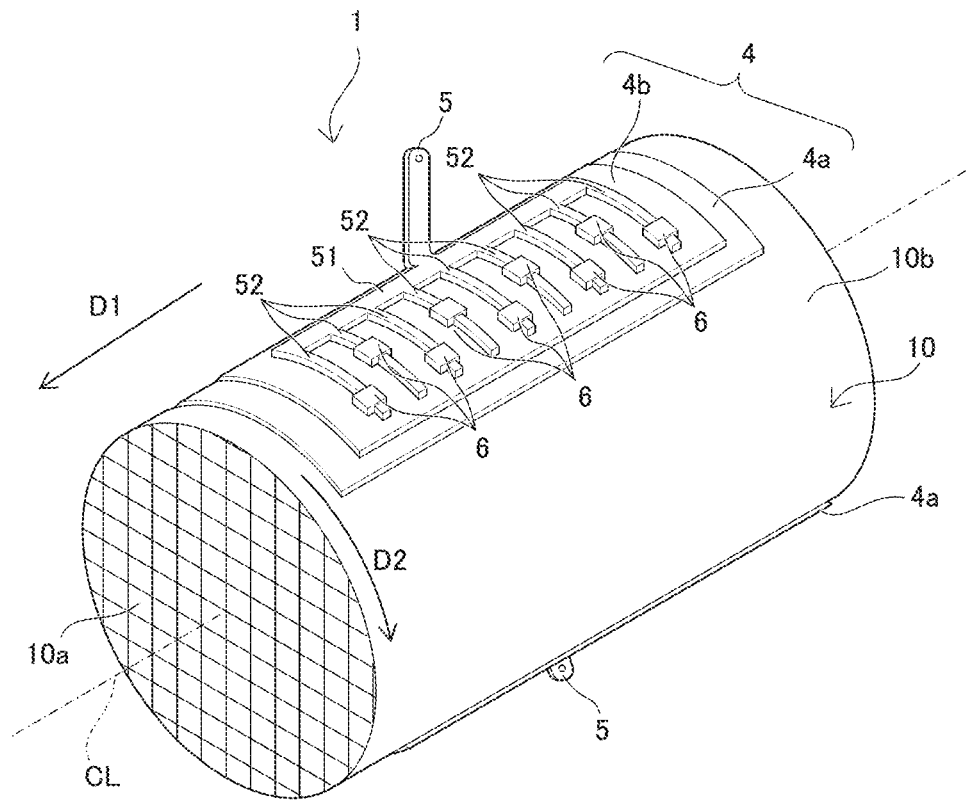
FIG. 1A is a schematic perspective view of an electrically heated catalyst device in accordance with an embodiment of the present disclosure.

An electrically heated catalyst device 1 is, for example, a device adapted to be disposed on an exhaust passage of an automobile or the like so as to purify exhaust gas discharged from an engine. As illustrated in FIG. 1A, the electrically heated catalyst device 1 includes a carrier 10, a base layer 4, comb-shaped electrodes 5, and fixation layers 6.

As illustrated in FIG. 1A, the carrier 10 is a porous member made of ceramic and having a cylindrical external shape. The inside of the carrier 10 has a honeycomb structure 10a so that exhaust gas can pass through the inside of the carrier 10, specifically, through a plurality of voids extending along the central axis CL of the carrier 10.

Ceramic that forms the carrier 10 may be, for example, a composite material of SiC (silicon carbide) particles and Si (silicon) particles, but is not particularly limited as long as it is conductive ceramic. Further, a metal catalyst, such as platinum, palladium, or rhodium, is supported on wall faces that form the honeycomb structure 10a of the carrier 10.

A base layer 4 for fixing the comb-shaped electrodes 5 described below on the carrier 10 is formed on the outer peripheral surface 10b of the carrier 10. The base layer 4 is provided between the comb-shaped electrodes 5 and the carrier 10, and the pair of comb-shaped electrodes 5 are fixed on the base layer 4 via the fixation layers 6 described below.

In this embodiment, the base layer 4 is a layer on which each comb-shaped electrode 5 is adapted to be fixed, and another base layer 4 is also formed on the opposite side of the outer peripheral surface 10b of the carrier 10 across the central axis CL (i.e., at a position where the carrier 10 is rotated about the central axis CL by 180°). Specifically, each base layer 4 includes a first base layer 4a formed on the outer peripheral surface 10b of the carrier 10, and a second base layer 4b formed on the first base layer 4a. The first base layer 4a is made of a conductive ceramic material. In this embodiment, the first base layer 4a is a layer of a composite material of SiC (silicon carbide) particles and Si (silicon) particles.

Herein, the content of the SiC particles in the carrier 10 may be greater than the content of the SiC particles in the first base layer 4a. Accordingly, the resistance value of carrier 10 can be set higher than that of the first base layer 4a, and thus, the heat generation property of the carrier 10 can be enhanced.

Based on the premise of the aforementioned relationship, provided that the total content of the SiC (silicon carbide) particles and the Si (silicon) particles that form the carrier 10 is 100 volume %, the content of SiC (silicon carbide) in the carrier 10 may be 65 to 75 volume %. Meanwhile, provided that the total content of the SiC (silicon carbide) particles and the Si (silicon) particles that form the first base layer 4a is 100 volume %, the content of SiC (silicon carbide) in the first base layer 4a may be 55 to 65 volume %.

The second base layer 4b contains dispersed therein oxidized mineral particles of oxidized minerals, and is a layer in which the oxidized mineral particles are coupled together with a metallic matrix. Specific examples of the metallic matrix include a NiCr alloy and a MCrAlY alloy (where M is at least one element selected from the group consisting of Fe, Co, and Ni). Oxidized minerals are those containing oxide, such as $SiO_2$ or $Al_2O_3$, as a main component, and may also contain bentonite, mica, or a mixture thereof, for example. In this embodiment, the second base layer 4b is a layer obtained by spraying mixed powder, which contains a mixture of NiCr alloy particles to become a metallic matrix and bentonite particles to become oxidized mineral particles, onto the surface of the first base layer 4a.

In this embodiment, the resistance value of the second base layer 4b is the lowest, that of the first base layer 4a is the second lowest, and that of the carrier 10 is the highest. Therefore, the carrier 10 with the highest resistance value is heated more easily when current flows therethrough. In addition, setting the resistance value of the second base layer 4b to be lower than that of the first base layer 4a can allow current from the comb-shaped electrode 5 to more easily flow through the second base layer 4b in the circumferential direction D2 of the carrier 10. The first base layer 4a is a layer with a resistance value adjusted to an intermediate value so that current that has flowed through the second base layer 4b in the circumferential direction D2 of the carrier 10 (see FIG. 4A) can flow through the carrier 10.

Figure 1B:
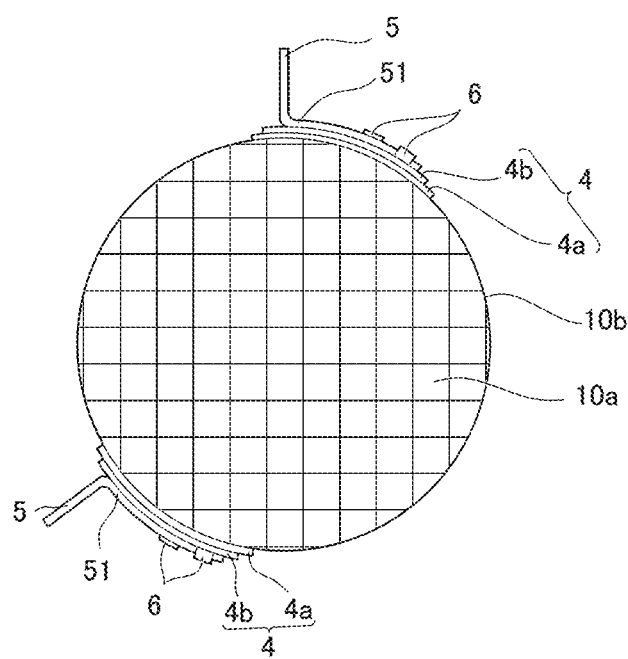
FIG. 1B is a side view of the electrically heated catalyst device illustrated in FIG. 1A.

In this embodiment, the electrically heated catalyst device 1 includes the pair of conductive comb-shaped electrodes 5 made of conductive metal, such as an Fe—Cr alloy (for example, stainless steel), as illustrated in FIG. 1B. The pair of comb-shaped electrodes 5 are arranged on opposite sides of the outer peripheral surface 10b of the carrier 10 across the central axis CL (i.e., at positions where the carrier 10 is rotated about the central axis CL by 180°). Each comb-shaped electrode 5 includes a proximal portion 51 extending along the longitudinal direction D1 of the carrier 10, and a plurality of wire portions 52 extending from the proximal portion 51 along the circumferential direction D2 of the carrier 10. It should be noted that the longitudinal direction D1 is a direction along the center line CL of the cylindrical carrier 10. In this embodiment, the proximal portion 51 is bent on the connection terminal side of the proximal portion 51 as illustrated in FIGS. 1A and 1B. Further, though not clearly illustrated in FIGS. 1A and 1B, the boundary portion between the proximal portion 51 and the wire portions 52 is slightly bent in the direction in which the proximal portion 51 becomes away from the outer peripheral surface 10b of the carrier 10. Accordingly, the proximal portion 51 is not in contact with the outer peripheral surface 10b of the carrier 10.

Figure 2:
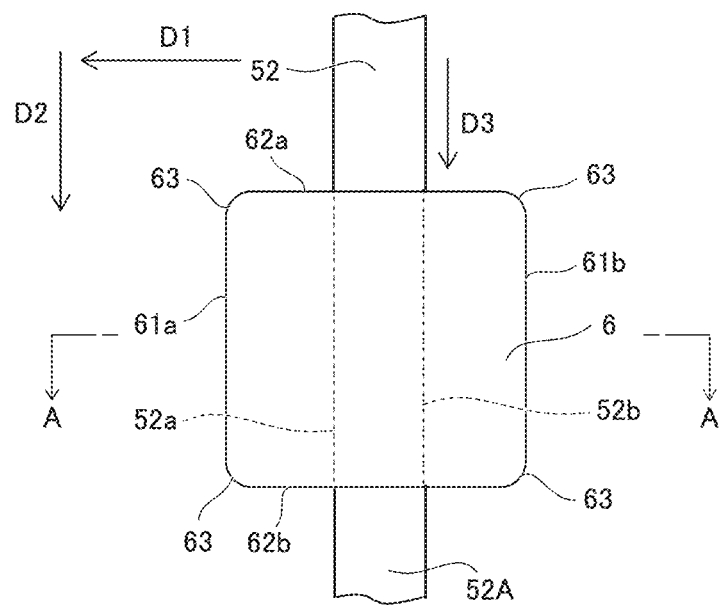
FIG. 2 is a schematic enlarged plan view of the primary portion of the electrically heated catalyst device illustrated in FIG. 1A.
Figure 3:
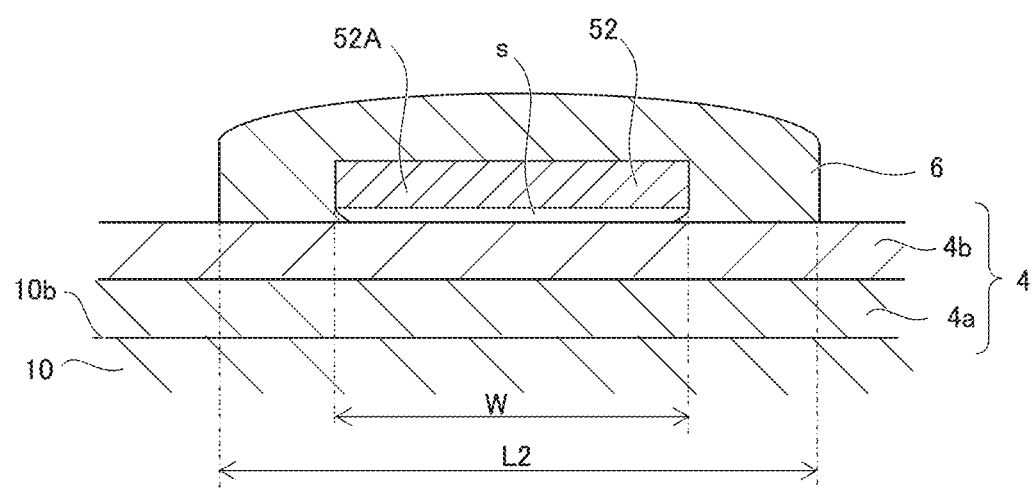
FIG. 3 is a cross-sectional view in the direction of the arrow along A-A illustrated in FIG. 2.

As illustrated in FIGS. 2 and 3, each fixation layer 6 is joined to the base layer 4 so as to partially cover each wire portion 52 on the opposite sides thereof, whereby the wire portion 52 is fixed on the base layer 4. That is, in this embodiment, each wire portion 52 is fixed on the base layer 4 (i.e., the second base layer 4b) via the fixation layer 6. As illustrated in FIG. 1, the plurality of fixation layers 6 for fixing each comb-shaped electrode 5 are arranged in a zigzag pattern along the circumferential direction D2. However, the fixation layers 6 may also be arranged linearly in parallel. Each fixation layer 6 is made of a material exemplarily illustrated as the material of the second base layer 4b. In this embodiment, each fixation layer 6 may be formed of the same material as that of the second base layer 4b.

Herein, with respect to the contents of oxidized minerals (or particles thereof), such as bentonite, and metal (or a matrix thereof), such as a NiCr alloy, in the second base layer 4b and each fixation layer 6, the content of the oxidized minerals (or particles thereof) may be 55 to 70 volume % of the total content of the oxidized minerals and the metal. Herein, the content of the metal (or a matrix thereof) in each fixation layer 6 may be less than that in the second base layer 4b. Accordingly, the coefficient of thermal expansion of each fixation layer 6 can be set close to that of each wire portion 52, which in turn can reduce thermal stress that would be applied to the fixation layer 6 due to thermal shrinkage of the wire portion 52.

Further, as illustrated in FIG. 2, each fixation layer 6 is rectangular in shape (which may be either a perfect rectangular shape or a generally rectangular shape) when the outer peripheral surface 10b of the carrier 10 is seen from a direction orthogonal to the central axis CL of the carrier 10 in the longitudinal direction D1. Although each fixation layer 6 in this embodiment is generally square in shape, it may also be rectangular in shape.

Specifically, among the four sides of each fixation layer 6, a pair of opposite first sides 61a and 61b of the rectangular fixation layer 6 are parallel with the extending direction D3 of each wire portion 52 on the opposite sides thereof. Further, a pair of second sides 62a and 62b coupling the opposite ends of the pair of first sides 61a and 61b are orthogonal to the extending direction D3 of each wire portion 52. In this embodiment, each wire portion 52 extends in the circumferential direction D2 of the carrier 10. Thus, the extending direction D3 of each wire portion 52 coincides with the circumferential direction D2.

Each corner 63 of the fixation layer 6 that is formed by an end of the first side 61a (61b) and an end of the second side 62a (62b) is roundish in this embodiment, though it may also have a right angle.

Further, a region of the wire portion 52 covered with the fixation layer 6 may be in contact with the base layer 4 as long as the wire portion 52 is fixed on the base layer 4 via the fixation layer 6. In this embodiment, however, a gap s is formed between the region of the wire portion 52 covered with the fixation layer 6 and the base layer 4.

2. Regarding a Method for Producing the Electrically Heated Catalyst Device 1

Hereinafter, a method for producing the electrically heated catalyst device 1 illustrated in FIG. 1 will be described with reference to FIGS. 4A to 4E.

Figure 4A:
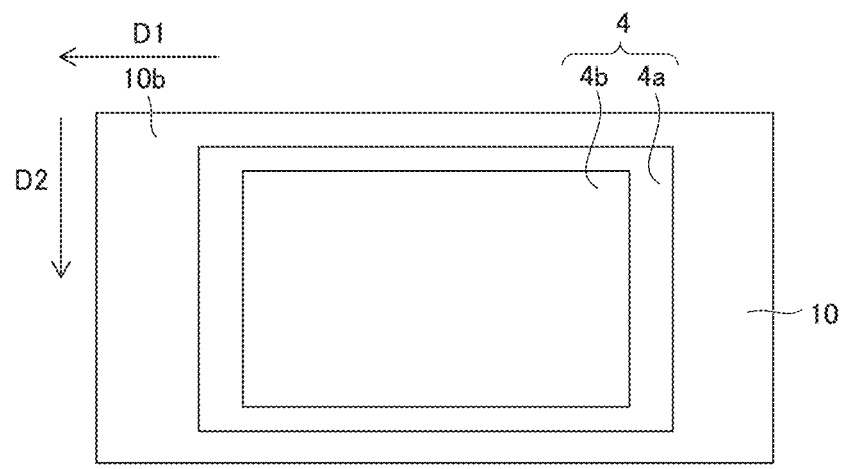
FIG. 4A is a schematic conceptual view illustrating a state in which a base layer is formed in a method for producing the electrically heated catalyst device illustrated in FIG. 1A.

First, as illustrated in FIG. 4A, the base layer 4 is formed on the outer peripheral surface 10b of the carrier 10 made of ceramic. In the step of forming the base layer 4, a pair of base layers 4 are formed. Specifically, first, the carrier 10 having the aforementioned metal catalyst supported thereon is prepared, and then, a paste material, which contains SiC (silicon carbide) particles and Si (silicon) particles dispersed therein using a dispersion medium, is applied to the outer peripheral surface 10b of the carrier 10, which is then baked, whereby the first base layers 4a and 4a are formed. Herein, the paste material may be applied using screen printing. After that, the metal catalyst is supported on the carrier 10.

Next, a masking member (not illustrated), which is made of metal and has openings corresponding to the shapes of the second base layers 4b and 4b, is arranged on the first base layers 4a and 4a. Next, powder containing a mixture of NiCr alloy particles and bentonite particles is sprayed toward the openings using gas flame spraying or plasma spraying, for example, so that the NiCr alloy is melted and the second base layers 4b and 4b are formed.

Figure 4B:
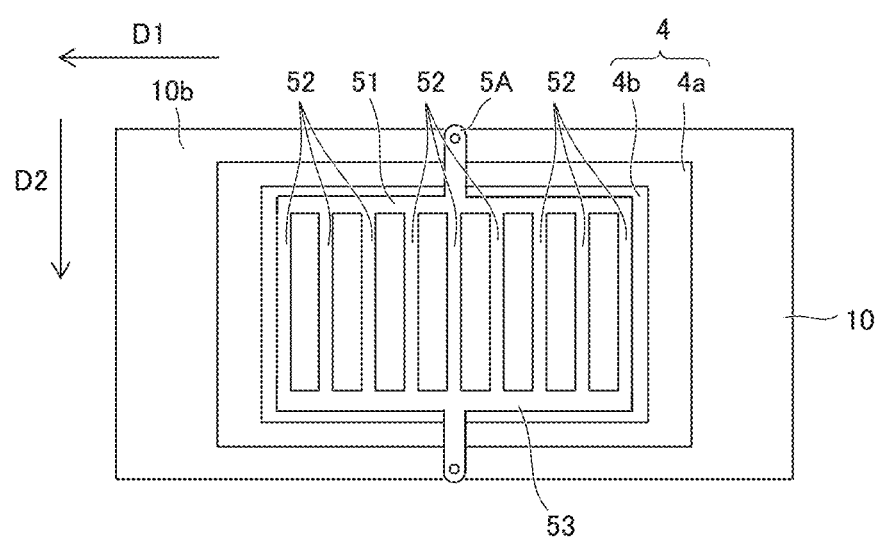
FIG. 4B is a schematic conceptual view illustrating a state in which an electrode is arranged in a method for producing the electrically heated catalyst device illustrated in FIG. 1A.

Next, as illustrated in FIG. 4B, an electrode 5A, which has the proximal portion 51 and the plurality of wire portions 52 extending from the proximal portion 51, is arranged on the surface of the base layer 4 (i.e., the second base layer 4b) such that the proximal portion 51 extends along the longitudinal direction D1 of the carrier 10 and the wire portions 52 extend along the circumferential direction D2 of the carrier 10. Specifically, the sheet-like electrode 5A is bent along the surface of the base layer 4.

In this embodiment, the electrode 5A includes the shapes of the wire portions 52 of one of the pair of comb-shaped electrodes 5, and has a structure obtained by further extending the wire portions 52 and coupling them together at a coupling portion 53. In this embodiment, the sheet-like electrode 5A is arranged along the surface of the base layer 4 while being pulled in the direction in which the proximal portion 51 and the coupling portion 53 of the sheet-like electrode 5A become away from each other. The redundant, extended portions of the wire portions 52 and the coupling portion 53 are cut away after the fixation layers 6 described below are formed.

Figure 4C:
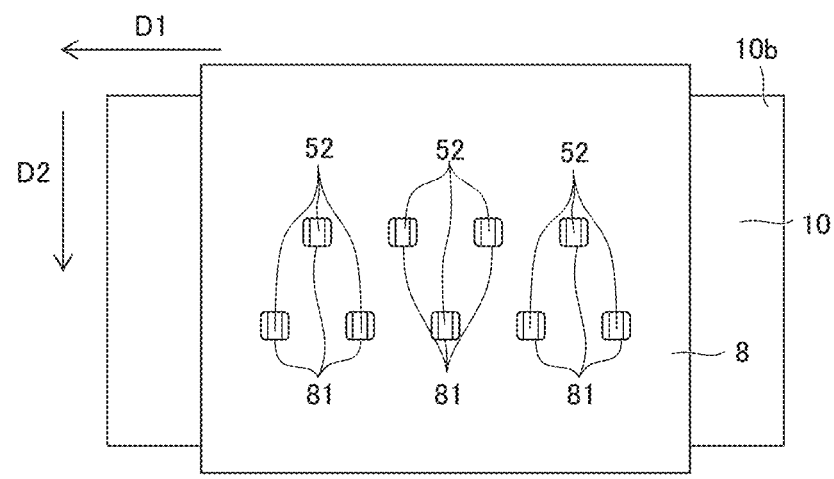
FIG. 4C is a schematic conceptual view illustrating a state before fixation layers are formed in a method for producing the electrically heated catalyst device illustrated in FIG. 1A.

Next, as illustrated in FIG. 4C, a masking member 8 is arranged on the outer peripheral surface 10b of the carrier 10 having the electrode 5A arranged thereon. The masking member 8 has rectangular openings 81 corresponding to the shapes and arrangement of the fixation layers 6. The masking member 8 is arranged on the outer peripheral surface 10b so that the wire portions 52 of the electrode 5A are exposed through the openings 81.

Figure 4D:
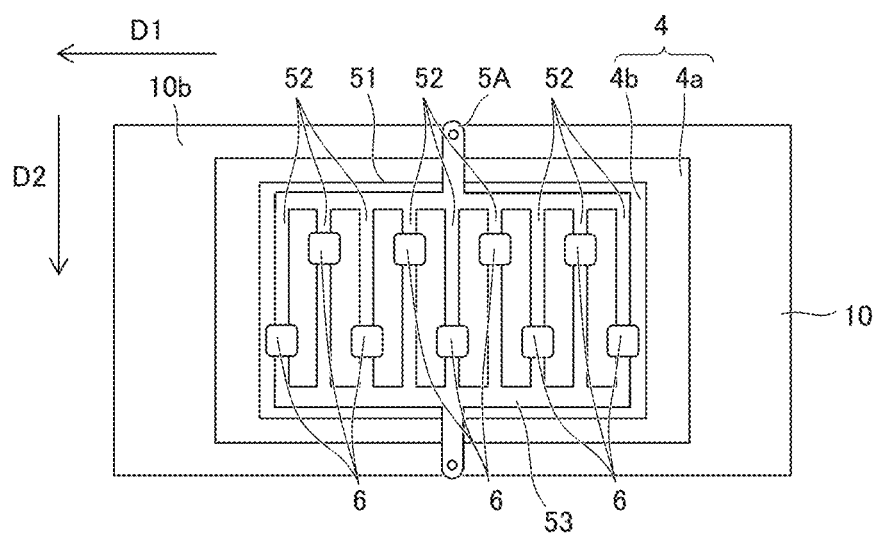
FIG. 4D is a schematic conceptual view illustrating a state after fixation layers are formed in a method for producing the electrically heated catalyst device illustrated in FIG. 1A.

Next, in the state illustrated in FIG. 4C, powder of a mixture of NiCr alloy particles and bentonite particles is sprayed toward the openings 81 using gas flame spraying or plasma spraying, for example, with the same method as that for the second base layer 4b, so that the fixation layers 6 are formed. Accordingly, as illustrated in FIG. 4D, the fixation layers 6 are formed such that they are joined to the base layer 4 while partially covering the wire portions 52 after the masking member 8 is removed, and accordingly, the wire portions 52 are fixed on the base layer 4 via the fixation layers 6.

More specifically, each fixation layer 6 is rectangular in shape (see FIG. 2 and the like) when the outer peripheral surface 10b of the carrier 10 is seen from a direction orthogonal to the central axis CL of the carrier 10 along the longitudinal direction D1. In addition, as described above, each fixation layer 6 is formed such that the pair of opposite first sides 61a and 61b of the rectangular fixation layer 6 become parallel with the extending direction of each wire portion 52 on the opposite sides of the wire portion 52. Further, each fixation layer 6 is formed such that the pair of second sides 62a and 62b coupling the opposite ends of the pair of first sides 61a and 61b become orthogonal to the extending direction D3 of each wire portion 52.

Further, the fixation layer 6 is formed such that each corner 63 of the fixation layer 6 where an end of the first side 61a or 61b meets an end of the second side 62a or 62b becomes roundish corresponding to the shape of each opening 81 of the masking member 8 (see FIG. 2 and the like). In addition, if a gap is partially formed between the base layer 4 and the electrode 5A when the electrode 5A is arranged on the base layer 4, a gap s is formed between the base layer 4 and the region of the wire portion 52 covered with the fixation layer 6 (see FIG. 3). The gap s is formed as follows. The second base layer 4b is a layer formed through spraying, and the surface of the second base layer 4b has formed thereon protrusions corresponding to the shapes of the bentonite particles. Since the wire portion 52 is partially in contact with the protrusions, a gap is formed between them in a state in which the electrode 5A is arranged on the second base layer 4b.

In this embodiment, each fixation layer 6 is formed such that the length L2 of the second side 62a (62b) becomes three times the width W of each wire portion 52. When the length 62a (62b) of the second side is set three times the width of each wire portion 52 or greater than that, the fixation layer 6 can be more reliably fixed on the base layer 4 on the opposite sides of the wire portion 52 even when a position displacement of the wire portion 52 occurs.

Figure 4E:
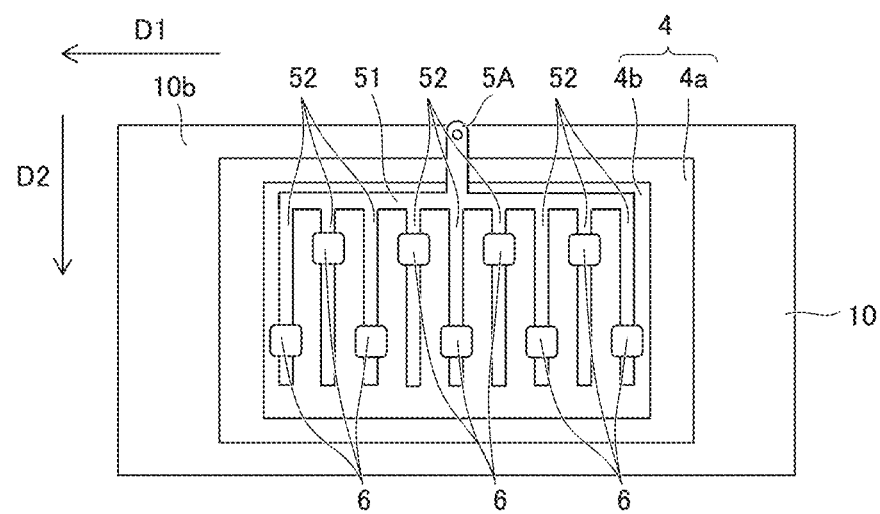
FIG. 4E is a schematic conceptual view illustrating a state after a comb-shaped electrode is formed in a method for producing the electrically heated catalyst device illustrated in FIG. 1A.

The redundant portions (e.g., the extended portions of the wire portions 52 and the coupling portion 53) are cut away from the electrode 5A so that the wire portions 52 of one of the comb-shaped electrodes 5 are fixed on the base layer 4 via the fixation layers 6 as illustrated in FIG. 4E. Next, the carrier 10 is rotated about the central axis CL by 180° and a series of the steps described with reference to FIGS. 4B to 4E is performed again so that the other comb-shaped electrode 5 is fixed on the base layer 4. Accordingly, the electrically heated catalyst device 1 illustrated in FIGS. 1A and 1B can be obtained. Finally, the boundary portion between the proximal portion 51 and the wire portions 52 is bent so that a gap is formed between the proximal portion 51 and the outer peripheral surface 10b of the carrier 10, and further, the proximal portion 51 is bent on the connection terminal side of the proximal portion 51.

During the production of the aforementioned electrically heated catalyst device 1, the relative positions of each wire portion 52 and each opening 81 of the masking member 8 may be displaced while the electrode 5A is arranged as illustrated in FIG. 4B or while the masking member 8 is arranged as illustrated in FIG. 4C.

Figure 5A:
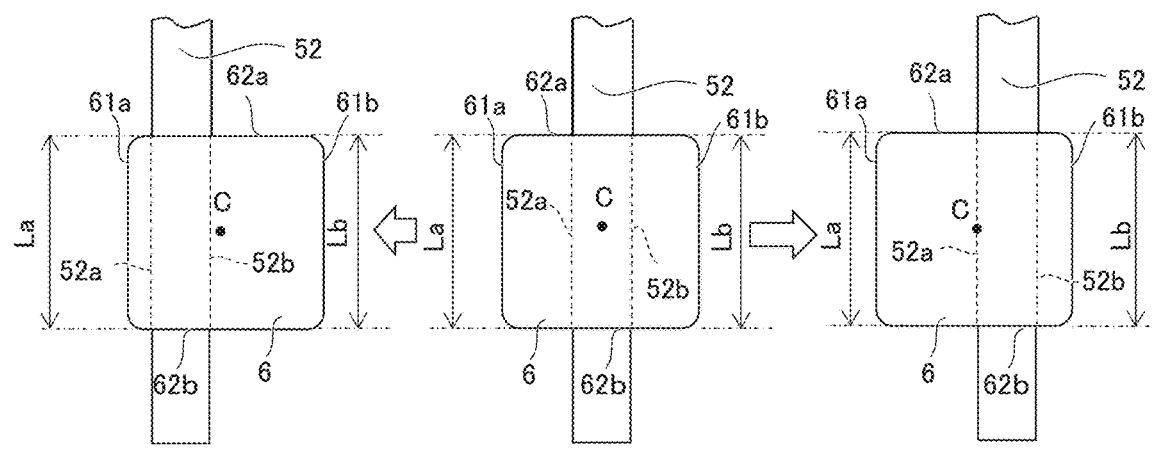
FIG. 5A is a schematic plan view for illustrating the positional relationship between a wire portion of a comb-shaped electrode and a fixation layer in the electrically heated catalyst device of the embodiment.
Figure 5B:
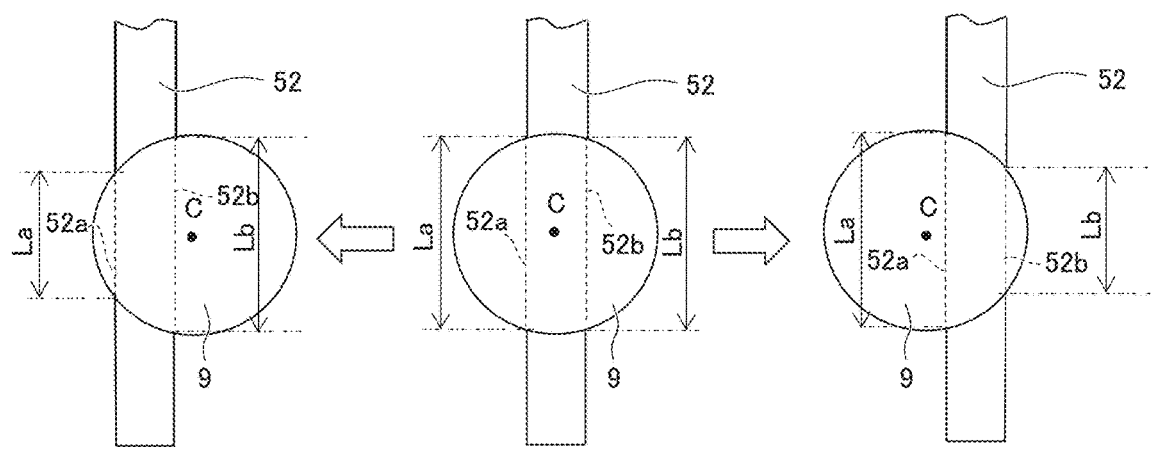
FIG. 5B is a schematic plan view for illustrating the positional relationship between a wire portion of a comb-shaped electrode and a fixation layer in an electrically heated catalyst device of a Comparative Example.

Accordingly, in the obtained electrically heated catalyst device 1, the position of each wire portion 52 with respect to the center C of each fixation layer 6 may be displaced from the normal position illustrated in the middle views of FIGS. 5A and 5B. Herein, as illustrated in FIG. 5B, when the position of the wire portion 52 with respect to the center C of a fixation layer 9, which has a circular shape as a comparative example, is displaced, the fixation layer 9 will have regions in contact with the respective opposite edges 52a and 52b of the wire portion 52 that have different contact lengths La and Lb. For example, the contact length La>the contact length Lb in the right view of FIG. 5B, and the contact length La<the contact length Lb in the left view of FIG. 5B.

When the contact lengths La and Lb of the fixation layer differ as described above, excessive stress would be generated in the region of the fixation layer with a greater contact length as is obvious from the analysis results described below. Such excessive stress can generate cracks in the region (for example, see a region 9a in FIG. 6B) of the fixation layer if current is repeatedly made to flow through the pair of comb-shaped electrodes 5.

However, as illustrated in FIG. 5A, in this embodiment, the opposite edges 52a and 52b of the wire portion 52 are arranged so as to face the respective first sides 61a and 61b of the fixation layer 6, and the second sides 62a and 62b of the fixation layer 6 are orthogonal to the extending direction D3 of the wire portion 52. Therefore, even when the wire portion 52 of the comb-shaped electrode 5 is fixed while being greatly displaced from the center C of the rectangular fixation layer 6 as illustrated in the right view or the left view of FIG. 5A, the lengths of the edges 52a and 52b of the wire portion 52 that are in contact with the fixation layer 6 can be made equal.

Accordingly, in this embodiment, stress applied to the regions of the fixation layer 6 that are in contact with the respective opposite edges 52a and 52b of the wire portion 52 becomes approximately equal, and thus, generation of excessive stress due to a position displacement of the wire portion 52 can be suppressed. Consequently, even when current is repeatedly made to flow through the pair of comb-shaped electrodes 5, generation of cracks in the fixation layer 6, which can uniformly heat the carrier 10 via the comb-shaped electrodes 5, can be suppressed.

Further, although the corners 63 of the fixation layer 6 are likely to have cracks generated therein due to thermal shocks applied thereto when current is repeatedly made to flow through the comb-shaped electrodes 5, generation of cracks in the corners 63 can be suppressed as they are roundish.

Further, as illustrated in FIG. 3, when the gap s is formed between the base layer 4 and a region of the wire portion 52 covered with the fixation layer 6, current flows through the base layer 4 from the wire portion 52 via the fixation layer 6. Therefore, excessive current is likely to flow through the regions of the fixation layer 6 that are in contact with the respective opposite edges of the wire portions 52, so that heat is generated in the regions and stress concentration is thus likely to occur therein. However, even in such a case, such stress concentration can be reduced in this embodiment since the contact lengths of the regions of the fixation layer 6 that are in contact with the respective opposite edges 52a and 52b of the wire portion 52 are equal.

EXAMPLES

Hereinafter, Examples of the present disclosure will be described.

Example 1

Figure 6A:
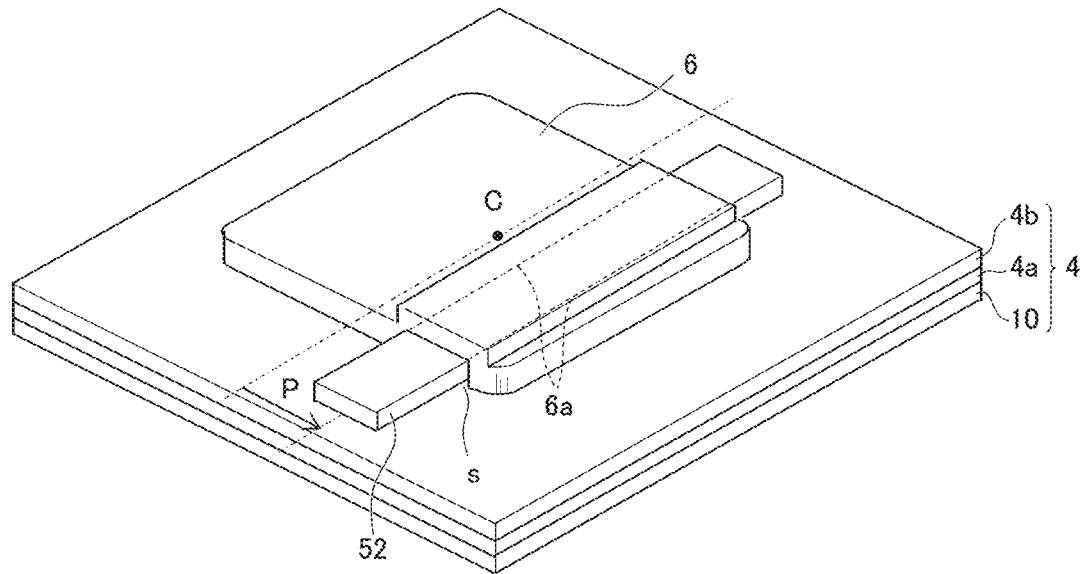
FIG. 6A is a perspective view of an exemplary analytical model of an electrically heated catalyst device of Example 1.

Thermal stress applied to fixation layers for fixing wire portions of an electrically heated catalyst device in accordance with an Example of the present disclosure was analyzed. In Example 1, analytical models, which have displacement amounts P of 0 mm (i.e., no displacement), 0.1 mm, 0.2 mm, and 0.3 mm, respectively, of the center of the wire portion 52 from the center of the fixation layer 6, were created as illustrated in FIG. 6A.

Herein, each analytical model was obtained by fixing the wire portion 52 with a width of 0.5 mm and a thickness of 0.1 mm on the base layer 4, which includes the first base layer 4a and the second base layer 4b, via the fixation layer 6. The fixation layer 6 was square (or rectangular) in shape, one side of the fixation layer 6 was set to 2 mm, the maximum thickness of the fixation layer 6 from the surface of the second base layer 4b was set to 5 mm, the fixation layer 6 was formed in a partially protruding manner corresponding to the thickness of the wire portion 52, and the radius of curvature of each roundish corner of the fixation layer 6 was set to 0.2 mm. Further, the size of the gap s between the wire portion 52 and the base layer 4 was set to 0.1 mm. In the analytical model, it is supposed that the outer wall of the carrier 10 on which the base layer 4 was formed has a plate shape.

Comparative Example 1

Figure 6B:
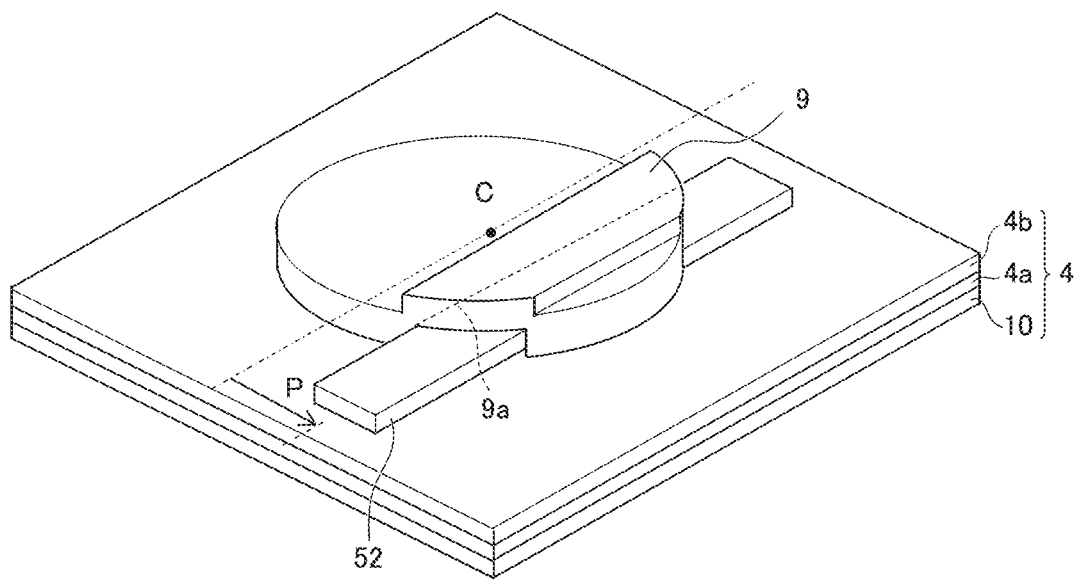
FIG. 6B is a perspective view of an exemplary analytical model of the electrically heated catalyst device of Comparative Example 1.

As in Example 1, analytical models, which have displacement amounts P of 0 mm (i.e., no displacement), 0.1 mm, 0.2 mm, and 0.3 mm, respectively, of the center of the wire portion 52 from the center C of the fixation layer 9, were created. Comparative Example 1 differs from Example 1 in that the fixation layer 9 of each analytical model has a circular shape with an outside diameter of 2 mm as illustrated in FIG. 6B.

<Analysis of Thermal Stress and its Results>

Figure 7:
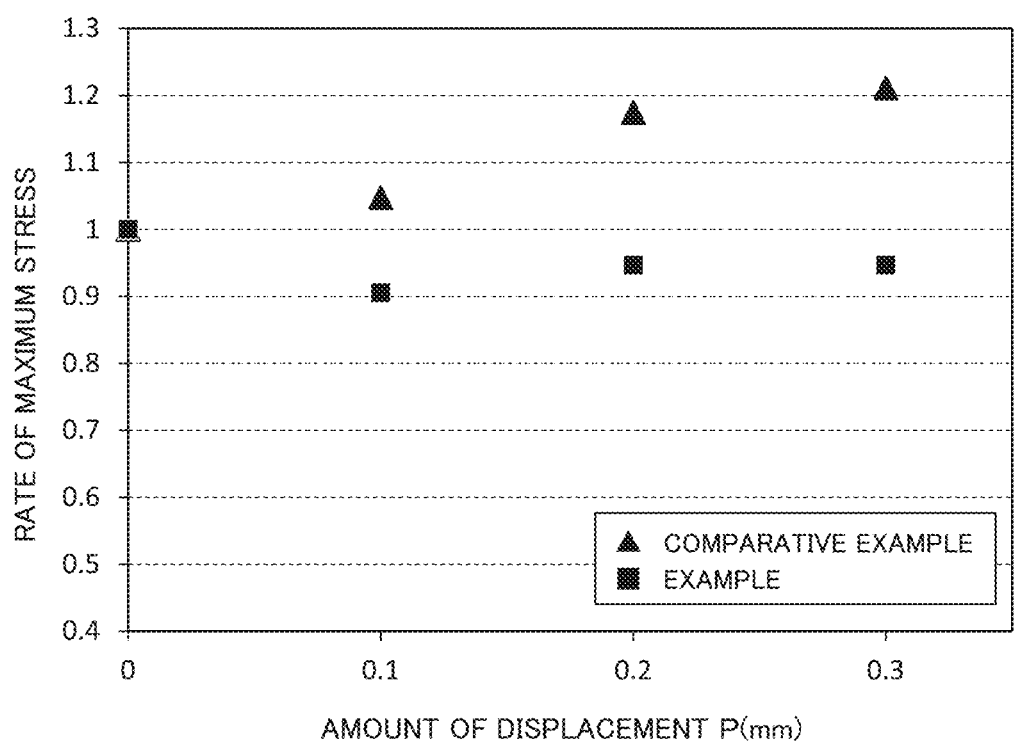
FIG. 7 is a graph showing the relationship between the amount of displacement of a wire portion from a fixation layer of each of Example 1 and Comparative Example 1 and the rate of the maximum stress in the fixation layer.

The physical property values of the materials exemplarily illustrated in the aforementioned embodiment were provided to the wire portions 52, the carrier 10, the first base layer 4a, the second base layer 4b, and the fixation layers 6 of each of the analytical models of Example 1 and Comparative Example 1. Then, all of them were uniformly heated at a temperature of 150 to 600° C., and the maximum stress acting on the fixation layers 6 was calculated through thermal stress analysis (ABAQUS produced by Dassault Systemes). FIG. 7 shows the results. The rate of the maximum stress on the ordinate axis of FIG. 7 indicates the rate provided that the maximum stress that is applied to the fixation layer when the displacement amount P of each of the analytical models of Example 1 and Comparative Example 1 is 0 mm is 1.

The maximum stress of Example 1 hardly changed even with an increase in the displacement amount P, while the maximum stress of Comparative Example 1 increased with an increase in the displacement amount P. In Example 1, the maximum stress of the fixation layer 6 was generated in regions 6a of the fixation layer 6 in contact with the respective opposite edges of the wire portion 52. Meanwhile, in Comparative Example 1, the maximum stress of the fixation layer 9 was generated in a region 9a of the fixation layer 9 in contact with an edge of the wire portion 52 having a greater contact length. Accordingly, it is considered that since the contact lengths of the regions of the fixation layer that are in contact with the respective opposite edges of the wire portion 52 can be made approximately equal when the rectangular fixation layer is provided as in Example 1, an increase in the maximum stress due to a position displacement of the wire portion 52 can be reduced.

Example 2

An electrically heated catalyst device such as the one illustrated in FIG. 1, which includes 11 wire portions, was produced in accordance with the procedures illustrated in FIGS. 4A to 4E. First, a carrier containing SiC particles and Si particles as main components and having a diameter of 80 mm and a length of 65 mm was prepared, and a metal catalyst was supported on the carrier. The content of the SiC particles in the carrier relative to the total content of the SiC particles and the Si particles in the carrier was 70 volume %, and the content of the Si particles therein was 30 volume %. Then, a paste material containing a mixture of SiC particles and Si particles was applied to the peripheral surface of the carrier, which was then baked to form a first base layer. The content of the SiC particles in the fixation layer relative to the total content of the SIC particles and Si particles in the fixation layer was 60 volume %, and the content of the Si particles therein was 40 volume %. The first base layer was a porous layer having a thickness of 0.23 mm and a porosity of 40 volume % relative to the entire first base layer. Next, powder to be sprayed, which contains a mixture of NiCr particles of Ni-50Cr (by 32 volume %) and bentonite particles (by 68 volume %), was sprayed onto the first base layer using plasma spraying so as to form a porous second base layer (see FIG. 4A). The second base layer was a porous layer having a thickness of 0.1 mm and a porosity of 10 volume % relative to the entire second base layer.

Next, an electrode made of stainless steel (Fe-20Cr-5Al) and having 11 wire portions each having a width of 1 mm was prepared and arranged on the second base layer as illustrated in FIG. 4B. Then, as illustrated in FIG. 4C, the electrode was covered with a masking member with rectangular openings each having a size of 3 mm×3 mm. Next, fixation layers were formed using the same method as that for the second base layer. After the fixation layers were formed, the masking member was removed and the redundant portions were cut away so that one of the comb-shaped electrodes was fixed on the base layer via the fixation layers. Further, the carrier 10 was rotated about the central axis CL by 180°, and the other comb-shaped electrode was fixed on the base layer through the aforementioned steps so as to obtain an electrically heated catalyst device.

Comparative Example 2

An electrically heated catalyst device was produced as in Example 2. Comparative Example 2 differs from Example 2 in that during formation of fixation layers, fixation layers each having a diameter of 3 mm were formed using a masking member with circular openings each having a diameter of 3 mm.

<Evaluation Test and its Results>

The electrically heated catalyst device produced in each of Example 2 and Comparative Example 2 was subjected to 2000 cycles of a test of repeatedly flowing current through the pair of comb-shaped electrodes so that the temperature of the carrier changed under a temperature environment of 150 to 900° C. During the test, it was confirmed that the electrodes of the electrically heated catalyst device of Comparative Example 2 had lower conductivity than those of Example 2.

Figure 8A:
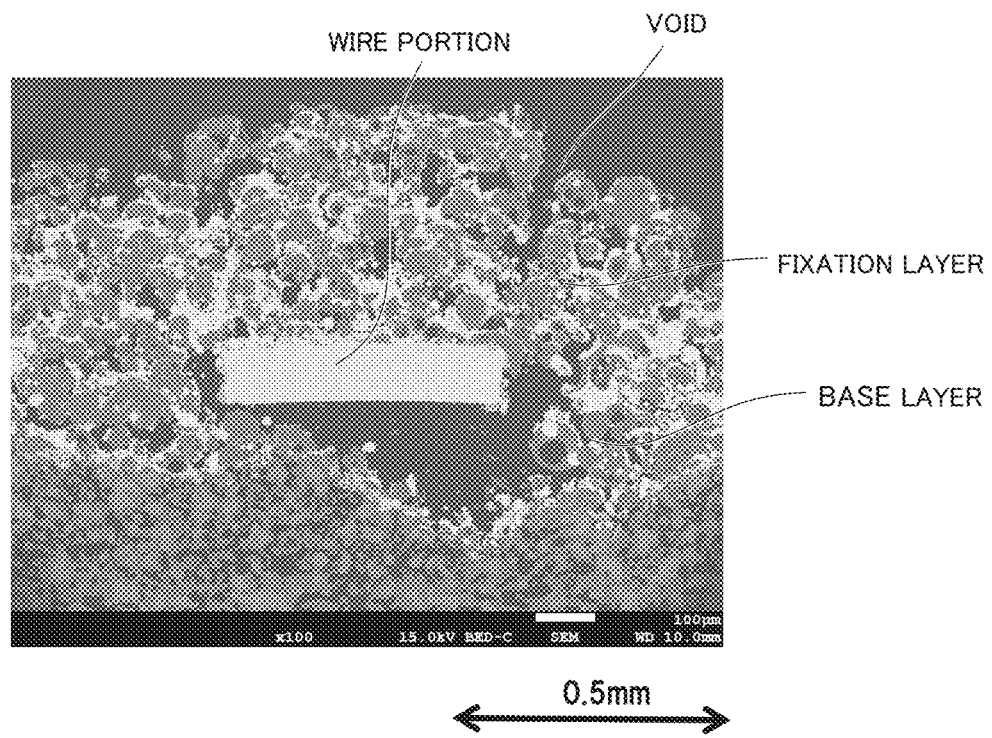
FIG. 8A is a photograph of the cross-section of a region around a fixation layer of Example 2.
Figure 8B:
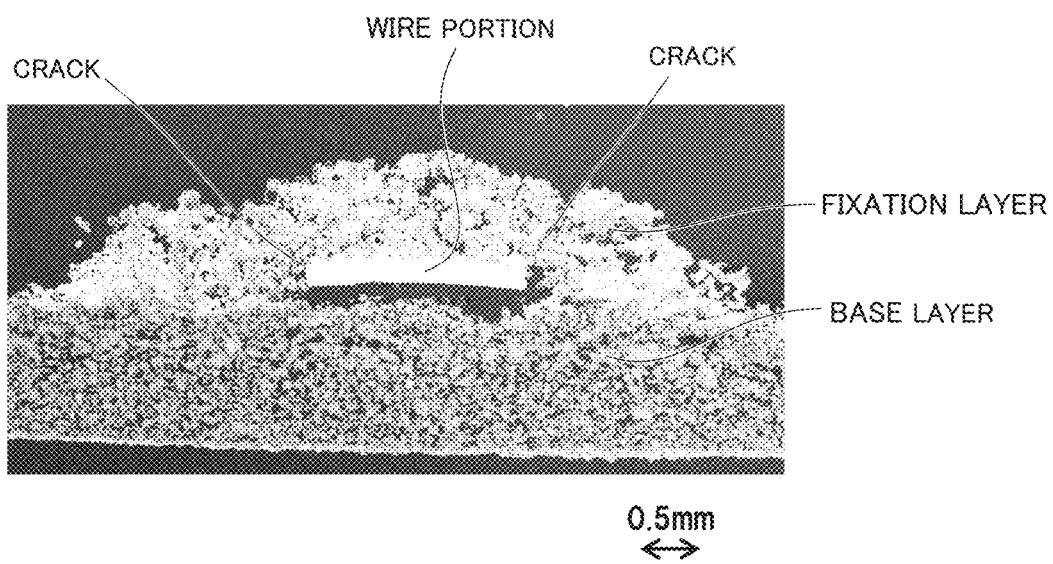
FIG. 8B is a photograph of the cross-section of a region around a fixation layer of Comparative Example 2.

Further, of a region around the fixation layer of the electrically heated catalyst device of each of Example 2 and Comparative Example 2 after the evaluation test, a region where the wire portion is displaced from the center of the fixation layer by 0.1 mm was cut out, and its cross-section was observed with a microscope. FIGS. 8A and 8B show the results. FIG. 8A is a photograph of the cross-section of a region around the fixation layer of Example 2, and FIG. 8B is a photograph of the cross-section of a region around the fixation layer of Comparative Example 2.

It was found that in Example 2, voids were formed in the fixation layer, but no cracks were generated that would reach the outer surface of the fixation layer from the region of the fixation layer in contact with the wire portion, while in Comparative Example 2, cracks reaching the outer surface of the fixation layer from the region of the fixation layer in contact with the wire portion were generated. Accordingly, it is considered that in Comparative Example 2, the cracks generated in the fixation layer resulted in the decreased conductivity of the comb-shaped electrode. Meanwhile, when a rectangular fixation layer was provided as in Example 2, it is considered that an increase in the stress due to a position displacement of the wire portion can be reduced, and generation of cracks can thus be reduced since the contact lengths of the regions of the fixation layer that are in contact with the respective opposite edges of the wire portion can be made approximately equal.

Although an embodiment of the present disclosure has been described in detail above, the present disclosure is not limited thereto, and various design changes can be made without departing from the spirit and scope of the present disclosure recited in the appended claims.

What is claimed is:

1. An electrically heated catalyst device, comprising:
a carrier having a metal catalyst supported thereon;
a pair of comb-shaped electrodes each including a proximal portion and a plurality of wire portions, the proximal portion extending along a longitudinal direction of the carrier, and the wire portions extending from the proximal portion along a circumferential direction of the carrier;
a base layer formed on an outer peripheral surface of the carrier, the base layer being provided between each comb-shaped electrode and the carrier; and
a fixation layer joined to the base layer so as to partially cover each wire portion, thereby fixing each wire portion on the base layer,
wherein:
the fixation layer is rectangular in shape when the outer peripheral surface of the carrier is seen from a direction orthogonal to a central axis of the carrier along the longitudinal direction, and
a pair of opposite first sides of the rectangular fixation layer are parallel with an extending direction of each wire portion on opposite sides of the wire portion, and a pair of second sides coupling opposite ends of the pair of first sides are orthogonal to the extending direction of each wire portion.

2. The electrically heated catalyst device according to claim 1, wherein a corner of the fixation layer that is formed by an end of each first side and an end of each second side is roundish.

3. The electrically heated catalyst device according to claim 1, wherein a gap is formed between the base layer and a region of each wire portion covered with the fixation layer.

* * * * *